May 30, 1961 R. P. JAEGER 2,986,724

NEGATIVE RESISTANCE OSCILLATOR

Filed May 27, 1959 3 Sheets-Sheet 1

INVENTOR
R. P. JAEGER
BY
Harry C. Hart
ATTORNEY

May 30, 1961 R. P. JAEGER 2,986,724

NEGATIVE RESISTANCE OSCILLATOR

Filed May 27, 1959 3 Sheets-Sheet 2

INVENTOR
R. P. JAEGER
BY Harry C. Hart
ATTORNEY

NEGATIVE RESISTANCE OSCILLATOR

Filed May 27, 1959 3 Sheets-Sheet 3

INVENTOR
R. P. JAEGER
BY Harry C. Hart
ATTORNEY

United States Patent Office 2,986,724

Patented May 30, 1961

2,986,724

NEGATIVE RESISTANCE OSCILLATOR

Robert P. Jaeger, Berkeley Heights, N.J., assignor to Bell Telephone Laboratories, Incorporated, New York, N.Y., a corporation of New York Filed May 27, 1959, Ser. No. 816,308

11 Claims. (Cl. 340—166)

This invention deals with electronic oscillators and, more specifically, with oscillators which employ devices characterized by a particularly defined region of negative resistance.

The general principles of the operation of negative resistance oscillators are well known. In one of its basic forms such an oscillator comprises a tuned circuit shunted by an impedance device which is characterized by a region of negative resistance. It will be understood that the term "region" as used immediately above, and in all instances below, is meant to define a particular portion of the voltage-current operating characteristic curve of an identified device or circuit.

In the case of a conventional tuned circuit, which includes only positive resistance, oscillations, which may be initiated by a pulse, for example, are immediately subject to exponential decay as the result of the energy dissipation which takes place. In a region of negative resistance, however, a slight change in either current or voltage is accompanied by a corresponding change in the other in a reverse direction. Accordingly, a negative resistance device may, in effect, be employed as the equivalent of a source of energy which tends to maintain the oscillations of a resonant circuit at a constant amplitude.

Negative resistance oscillators employed in circuits embodying the principles of the invention may be identified, in part, by the property of "oscillation hysteresis." In a very restricted sense this characteristic has been recognized and defined elsewhere, as for example by Appleton and Van der Pol in the Philosophical Magazine and Journal of Sciences, volume 43, 1922, pages 177–193. Heretofore, however, oscillation hysteresis has been neither fully understood nor turned to account.

Briefly, oscillation hysteresis defines a particular relation between oscillation amplitude and one of the circuit parameters, bias magnitude for example. Specifically, in a negative resistance oscillator characterized by oscillation hysteresis, oscillations start abruptly with a change in bias beyond a particular point. Further change in the bias point in the same direction serves to increase the amplitude of oscillations only slightly. By then reversing the direction of the bias change, oscillation amplitude is reduced slightly but oscillations are sustained well past the point of bias that initiated the oscillations. Oscillations then terminate abruptly and cannot be restored until the bias is again shifted back to the point where oscillations were first initiated. Stated otherwise, the relation between the oscillation amplitude and the bias parameter is irreversible so that for certain values of this parameter the amplitude may be either zero or finite according to the route by which those values are approached.

The failure of known circuit arrangements to exploit this phenomenon in all of its aspects has limited the utility of such circuits and, as a consequence, they are unsuitable, in particular, for specific applications relating to the field of microwave logic, other pulse systems, and storage devices.

One general object of the invention, therefore is to provide an improved negative resistance oscillator.

A further object is to provide a negative resistance oscillator in which oscillations may be initiated and terminated with maximum simplicity and reliability.

A more specific object is to provide a negative resistance oscillator adapted for use as an element of microwave logic circuitry.

An additional object is to provide a simplified system for the conversion of direct-current pulses into pulses comprising bursts of high-frequency electromagnetic energy.

These and other objects are achieved in accordance with the principles of the invention in a negative resistance oscillator employing a negative resistance element of particularly defined characteristics, in combination with specific pulse generating circuitry. In effect, the novel combinations of the invention turn to account and fully exploit the phenomenon of oscillation hysteresis described above.

Any region of negative resistance is necessarily bounded by regions of positive resistance and, in part, the principles of the invention stem from the discovery that by employing a negative resistance device with a particular defined relation among the absolute magnitudes of the negative resistance and the two positive resistances which bound the negative resistance region, a negative resistance oscillator will exhibit the oscillation hysteresis characteristic and will generate sustained oscillations of constant amplitude about an operating point in one of the regions of positive resistance. Additionally, by combining an oscillator of the type described with suitable pulse circuitry, oscillations can be initiated by a pulse of a particular magnitude and polarity and terminated with a pulse of like polarity but lesser magnitude.

In accordance with the invention, the relation among the absolute magnitudes of the three resistance regions in the negative resistance device must be such that the average resistance of the first positive resistance region must be greater than the absolute magnitude of the average resistance of the adjacent negative resistance region, which in turn must be greater than the average resistance of the second positive resistance region. As will be explained in detail below, it is the relation between the absolute magnitudes of the negative resistance and the second positive resistance which enables the generation of oscillations about a point in the second positive resistance region to be sustained, and it is the relation between the absolute magnitudes of the negative resistance and the first positive resistance which enables the termination of oscillations by a pulse of the same polarity but lesser magnitude than the pulse employed to initiate oscillations.

In one illustrative embodiment of the features of the invention a silicon P–N junction diode with avalanche breakdown characteristics which define a region of negative resistance bounded by first and second regions of positive resistance, the absolute magnitudes of the resistances being in accord with the principles of the invention as described above, is positioned in a resonant cavity to provide a negative resistance microwave oscillator. The frequency of the oscillations is determined by the inductance of the cavity and by the capacitance of the diode. Biasing means are employed to establish an operating point in the positive resistance region of the diode which is on the opposite boundary of the negative resistance region from the point of avalanche breakdown.

The negative-resistance, resonant-cavity oscillator is arranged in combination with a pulse generator which produces a pair of like polarity output pulses to represent an information bit, the first pulse of each pair being of greater magnitude than the second pulse. The first pulse is of sufficient amplitude to drive the operating point of the oscillator well into the first positive resistance region. The collapse of the pulse and the accompanying shift of the operating point back to its initial position provides a sufficient shock or transient to initiate energy transfer between the inductance and the capacitance of the circuit and the resulting oscillations are of sufficient amplitude so that the energy which is lost in the positive resistance region is in effect regained in the region of negative resistance. The second or short pulse is of sufficient amplitude to shift the operating point into the region of negative resistance, but the relation between the absolute magnitudes of the first positive resistance and the negative resistance is such that the amplitude of oscillations is substantially reduced. Consequently, with the collapse of the second pulse and the accompanying shift of the operating point back to its initial position, oscillations are abruptly terminated since the amplitude of the oscillations is no longer sufficient to reach the region of negative resistance.

In another illustrative embodiment the features of the invention are employed in connection with a pulse code modulation system which in effect translates direct-current pulses into pulse-like bursts of high-frequency electromagnetic energy only when there is coincidence between a clock pulse and a signal pulse. The output of the oscillator thus comprises bursts of high-frequency oscillations each corresponding to a respective pair of input pulses.

In accordance with the principles of the invention, the negative resistance element of the oscillator is biased to a point in the second region of positive resistance. The amplitude of the clock pulses is adjusted so that the coincidence of a clock pulse and a signal pulse above a preassigned threshold is sufficient to initiate oscillations. Accordingly, successive coincidences between clock pulses and corresponding signal pulses result in a continuous oscillatory output. A utilization device, which may include a scanning device, inspects the output between each clock pulse and the next and interprets the presence of oscillations as a pulse and the absence of oscillations as a space. When a clock pulse appears in a time slot without a signal pulse, the clock pulse is of sufficient amplitude to terminate oscillations but of insufficient amplitude to initiate oscillations. Although the amplification and transmission of direct-current pulses at high pulse repetition rates can be effected with only limited efficiency, the pulses of a pulse code modulation system in accordance with the invention may be readily amplified and transmitted by microwave techniques.

An additional embodiment of the invention demonstrates the use of a negative resistance oscillator in accordance with the invention as an information storage element or memory device. The aspect of the invention which enables oscillations to be started and stopped with pulses of like polarity and unlike magnitudes is employed as the basis for a unique but relatively simple arrangement that affords non-destructive alternating current readout.

Accordingly, included among the features of the invention is a negative resistance oscillator which shifts from a quiescent to an oscillating state in response to a single pulse of a preassigned polarity and magnitude and which shifts from an oscillating to a quiescent condition in response to a pulse of like polarity but of lesser magnitude.

Another feature of the invention is a negative resistance oscillator that produces oscillations about an operating point lying in a region of positive resistance.

A further feature of the invention is a free-running, controllable oscillator which employs an asymmetrically conducting impedance device characterized by a region of negative resistance, $R_N$, bounded by a first region of positive resistance, $R_{1P}$, and a second region of positive resistance, $R_{2P}$, wherein the average absolute magnitudes of said resistances are expressed by the relation $$|R_{1P}|>|R_N|>|R_{2P}|$$

The principles of the invention together with additional objects and features thereof will be fully apprehended by considering the following detailed description and accompanying drawings in which.

Figure 6A:
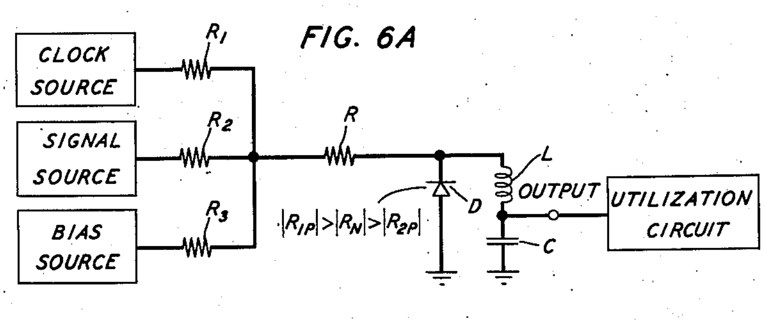
Figure 6B:
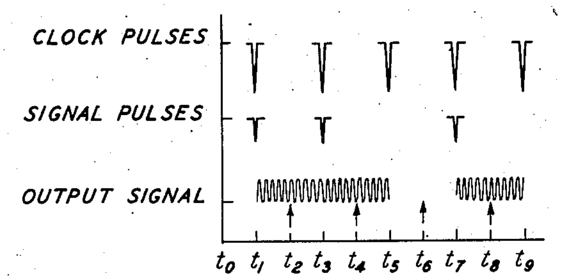
Figure 7A:
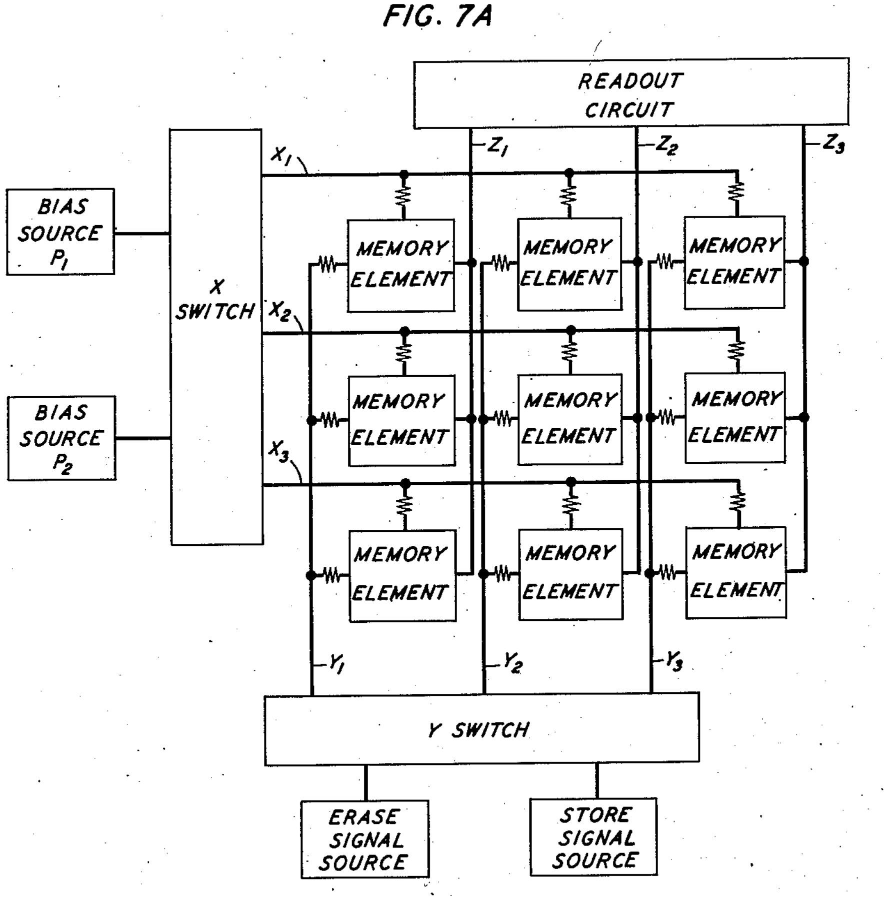
Figure 7C:
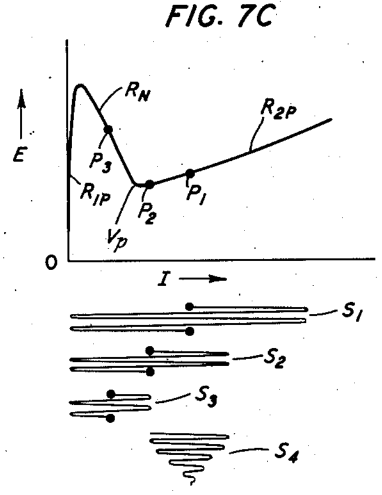
Figure 7B:
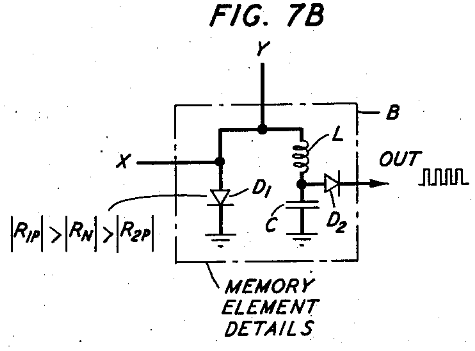

Fig. 6A is a schematic circuit diagram of a pulse code modulation arrangement in accordance with the invention, and Fig. 6B is a plot of illustrative input and output waveforms for the circuit of Fig. 6A; and Fig. 7A is a schematic circuit diagram of a memory or logic system embodying the principles of the invention, Fig. 7B is a schematic circuit diagram of the memory element shown in Fig. 7A, and Fig. 7C is a characteristic curve of the negative resistance device shown in Fig. 7B.

Figure 1A:
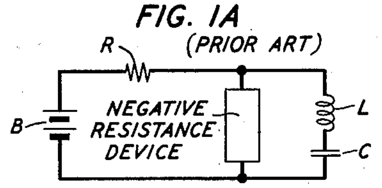
Fig. 1A is a schematic circuit diagram of a basic negative resistance oscillator in accordance with the prior art.
Figure 1B:
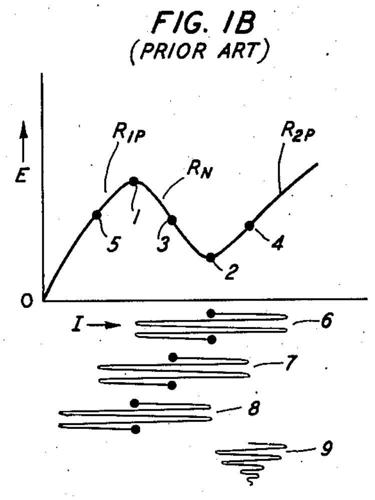
Fig. 1B is an operating characteristic curve for the negative resistance device shown in Fig. 1A.

Prior to a detailed consideration of the various embodiments of the invention, it will be helpful to review briefly the operating principles of conventional negative resistance oscillators. A circuit of this type is shown in Fig. 1A. The block designated "Negative Resistance Device" may be any one of a variety of devices or combinations thereof which are characterized by a negative resistance region bounded by positive resistance regions. An operating curve illustrating the characteristics of one representative type of negative resistance device is shown in Fig. 1B. There it will be noted that the negative resistance region $R_N$ is bounded by a first positive resistance region $R_{1P}$ and by a second positive resistance region $R_{2P}$. Of particular consequence are the relative absolute magnitudes of these three resistances. Specifically, the slopes of the two regions of positive resistance, $R_{1P}$ and $R_{2P}$, are substantially equal and further they are substantially equal in magnitude but opposite in sign to the slope of the negative resistance region $R_N$. Theoretically, oscillations 6 may be sustained about the valley point 2 since the energy dissipated in the positive resistance region $R_{2P}$ is compensated for by the energy gained in the negative region $R_N$. In practice, however, point 2 is not employed as an operating point since the slightest shift of bias into the positive region $R_{2P}$ causes a rapid decay of oscillations; more energy is dissipated in the positive resistance region $R_{2P}$ than can be regained in the negative resistance region $R_N$. This fact is further illustrated by the oscillations 9 which are centered about operating point 4. The oscillations 9 fall entirely within the positive resistance region $R_{2P}$ and, accordingly, decay rapidly. It is also evident that any excursions of oscillations about point 4 which reach into the negative resistance region $R_N$ must be matched with further penetration into the positive region $R_{2P}$; hence, rapid decay of such oscillations also would necessarily take place. Operating point 4 is therefore unconditionally stable.

Point 3 in the approximate center of the negative resistance region $R_N$ is a typical conventional operating point for negative resistance oscillators of the prior art. Oscillations 7 of fixed amplitude may be sustained about operating point 3 since the losses in energy which result in the excursions of the oscillations into the areas of positive resistance between points 1 and 5 and between points 2 and 4 are compensated or balanced by that part of the oscillations which occurs in the negative region between points 1 and 2. Consequently, the oscillations 7 attain an amplitude limited by points 4 and 5.

Oscillations 8 may be sustained, at least in theory, about the peak point 1, but it is apparent that the observations made with respect to oscillations 6 about point 2 apply with equal force.

An additional point of interest in the curve of Fig. 1B is that the amplitude of oscillations remains substantially constant while the operating point is shifted from point 2 toward point 1. It may be observed, however, that selected changes in the operating characteristics may be employed to bring about marked differences in the relation between operating point and oscillation amplitude. For example, it is evident that if the slope of the positive resistance segment $R_{1P}$ is increased, any shift in operating point location from point 2 toward point 1 will decrease the amplitude of the oscillations.

Figure 2:
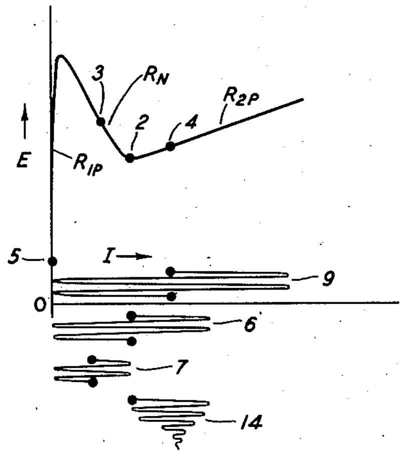
Fig. 2 is an operating characteristic curve of a negative resistance device employed in an oscillator in accordance with the invention.

Turning now to Fig. 2, the negative resistance device operating curve shown illustrates specifically how selected changes in the relation among the absolute magnitudes of the three resistance regions are reflected in the operating characteristics of a negative resistance oscillator employing such a device. As compared to the curve of Fig. 1B, the magnitude of the positive resistance region $R_{1P}$ has been increased and the magnitude of the positive resistance region $R_{2P}$ has been reduced so that the relation among the absolute magnitudes of the three resistance regions may be expressed as follows:

$$|R_{1P}|>|R_N|>|R_{2P}|$$

Of particular interest is the fact that point 4 is no longer unconditionally stable since relatively extended excursions into the positive resistance region $R_{2P}$, as shown by the oscillations 9, are compensated for by relatively brief excursions into the negative resistance region $R_N$. It is, of course, the reduction of the slope, or the resistance, in the $R_{2P}$ region that accounts for this phenomenon. Of equal interest, insofar as the principles of the invention are concerned, is the fact that a shift in operating point toward the left from point 4 reduces the amplitude of the associated oscillations. For example, oscillations 6 about point 2 are of lesser amplitude than the oscillations 9 about point 4, and oscillations 7 about point 3 are reduced, in proportion, to an even greater degree.

Circuitry characterized by properties of negative resistance bounded by areas of positive resistance, as illustrated in Fig. 2, is known in the art, being shown by McKay in the form of a single, two-terminal silicon P-I-N or N-I-P junction diode in his copending application Serial No. 464,737, filed October 26, 1954, now United States Patent No. 2,908,871, dated October 13, 1959, and by Shockley in the form of a combination of transistors in his Patent 2,655,609, issued October 13, 1953. Additionally, similar characteristics have been discovered recently in the reverse conduction region of commercially available silicon P-N junction diodes, as in a diode identified as a type 1N137A, for example.

Figure 3A:
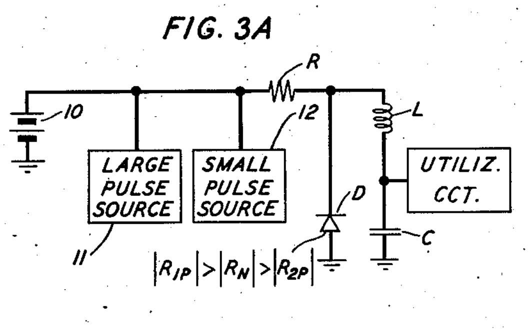
Fig. 3A is a schematic circuit diagram of a negative resistance oscillator in accordance with the invention.
Figure 3B:
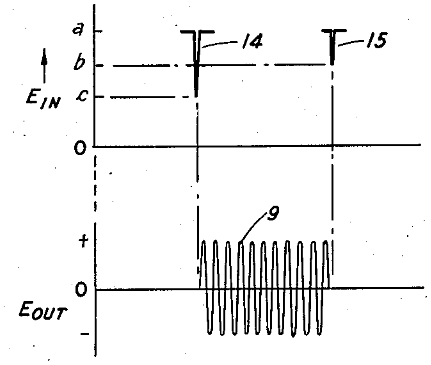
Fig. 3B is a plot of the pulses employed to initiate and terminate oscillations together with the associated oscillating output.

Specific apparatus embodying the principles of the invention is shown in Fig. 3A. The circuit comprises a source of biasing potential 10, a large pulse source 11, and a small pulse source 12. The bias source 10 and the pulse sources 11 and 12 are arranged to apply their respective potentials through resistor R across the parallel resonant circuit comprising the diode D, inductor L and capacitor C. As indicated, the diode D is characterized by a region of negative resistance in the direction of reverse conduction bounded by regions of positive resistance whose absolute magnitudes correspond approximately to those illustrated in Fig. 2. The bias source 10 establishes the quiescent condition of the circuit at point 4, as shown in Fig. 2. Fig. 3B shows an illustrative output signal 14 from the pulse source 11 which is of sufficient amplitude to drive the operating point into the first region of positive resistance $R_{1P}$ to a point such as 5 of Fig. 2. The collapse of the pulse 14 reestablishes the initial operating point and provides a transient of sufficient amplitude to excite the resonant circuit into an oscillating condition as shown by the oscillations 9 in both Fig. 2 and Fig. 3B.

Subsequent application of a pulse 15 of Fig. 3B from the pulse source 12 of Fig. 3A momentarily shifts the center of oscillations to the approximate center of the negative resistance region, illustrated by point 3 of Fig. 2. The amplitude of the oscillations is reduced abruptly as shown by the oscillations 7 of Fig. 2. The collapse of the pulse 15 of Fig. 3B immediately shifts the center of oscillations back to the initial operating point. However, the amplitude of the oscillations 14 of Fig. 2 is then insufficient to reach the region of negative resistance and they are quenched abruptly by the positive resistance of the diode. As shown in Fig. 3A, the output of the oscillator is applied to schematically illustrated utilization apparatus which may be transmission apparatus, for example. Although Fig. 3A shows the inductor L and the capacitor C in series relation, these elements may, alternatively, be arranged in parallel relation. A parallel arrangement, however, would require the addition of a coupling capacitor between the diode D and the LC circuit.

Further application of the principles of the invention is to be found in the field of microwave logic. In the digital computer art it is common to employ trains of direct-current pulses to process information in the form of binary or similar code systems. With the current requirements for increased speed in digital computers, a need has arisen for circuitry capable of accommodating pulse repetition rates of 50 to 100 million pulses per second. The lack of pulse amplifiers having sufficient bandwidth to amplify direct-current pulses at such rates and the relatively slow speed of other conventional computer components have led to the development of so-called "microwave logic" circuitry. Instead of direct-current pulses, microwave energy is employed to represent binary signals. Specifically, series of binary digits are represented by pulse trains in which each pulse is a burst of electromagnetic wave energy. Such systems are shown, for example, in the copending application of W. M. Goodall, Serial No. 619,435, filed October 31, 1956, now United States Patent No. 2,914,249, dated November 24, 1959.

Figure 4:
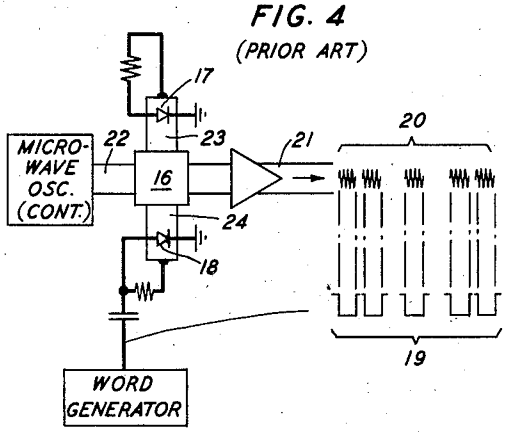
Fig. 4 is a schematic circuit diagram of a prior art microwave logic arrangement.

A basic unit of a microwave logic system similar to that described in the Goodall application is shown in Fig. 4. A high-frequency oscillator, such as a klystron, for example, applies a carrier frequency continuously to a hybrid junction 16 by means of the wave guide 22. When the diodes 17 and 18 in the control wave guides 23 and 24 have the same impedance, equal amounts of energy are reflected in phase to the junction 16 and none of the energy is transmitted to the output wave guide 21. When single polarity pulses 19 from the word generator are applied to the control diode 18, however, the impedance of the diode 18 changes, unequal amounts of energy are reflected back from the diodes 17 and 18 to the junction 16 and bursts of high-frequency energy 20 corresponding to the direct-current pulses 19 are applied to the output wave guide 21.

Figure 5A:
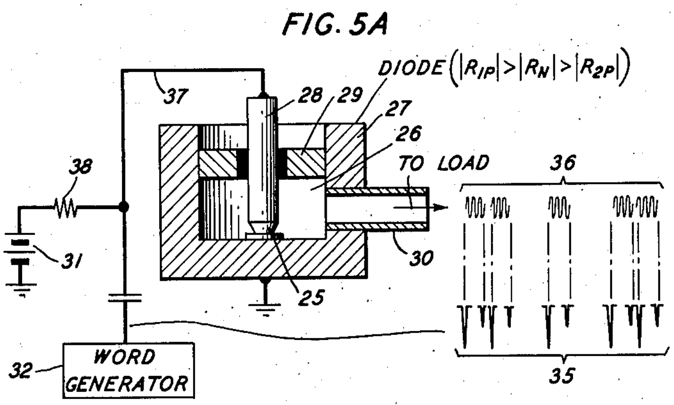
Fig. 5A is a schematic circuit diagram of a microwave logic arrangement in accordance with the invention.
Figure 5B:
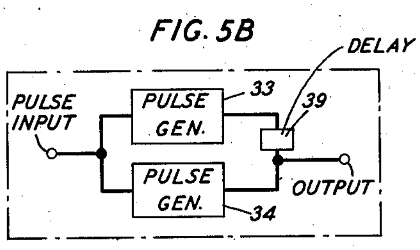
Fig. 5B is a detailed schematic circuit diagram of the word generator shown in Fig. 5A.

Figs. 5A and 5B show an arrangement that performs the same basic function as the circuit of Fig. 4. By employing the principles of the invention, however, a marked reduction in circuit complexity and a substantial increase in efficiency is attained. The apparatus of Fig. 5A includes a negative resistance diode 25 or other asymmetrically conducting impedance device having conduction characteristics similar to those illustrated by Fig. 2. The diode 25 is positioned in a resonant cavity 26 in somewhat the same fashion as shown by W. T. Read in a copending application Serial No. 656,239, filed May 1, 1957, now United States Patent No. 2,899,646, dated August 11, 1959. The walls 27 together with the adjustable plunger 29 determine the size of the cavity 26 which functions as an inductance tuned with the capacitance of the diode.

In accordance with the invention, a source of biasing potential 31 is employed to bias the diode 25, through resistor 38, to an operating point in the lower positive resistance region, as illustrated by point 4 in Fig. 2, for example. The word generator 32 applies pairs of output pulses 35 to the diode 25 through the conducting path 37, each pair comprising a pulse of a preassigned amplitude and a preassigned polarity and a second pulse of the same polarity but lesser amplitude. The word generator 32 may comprise apparatus substantially as shown by Goodall in the copending application cited above, modified to convert single pulses to the output pulse pairs 35. Such modification may readily be accomplished in a number of ways. For example, as shown in Fig. 5B a single pulse may be employed to trigger each of two pulse generators 33 and 34. Delay means 39 are shown interposed between the pulse generator 33 and the output point. The pulse generator 34 may be designed to generate pulses of greater amplitude than the generator 33, or, alternatively, the pulses of generator 33 may be clipped. As explained in connection with the circuit shown in Fig. 3A, the control pulses 35 are of such an amplitude that the greater amplitude pulse of each pair drives the diode operating point well into the first positive resistance region and the collapse of the pulse creates a transient that shocks the tuned circuit into an oscillating condition. Again, in accordance with the invention, the resulting oscillations are of sufficient amplitude to reach into the negative region. The energy dissipated in the positive region is compensated for and, consequently, oscillations are sustained. The lesser amplitude pulse of each pair shifts the diode operating point into the negative resistance region, the amplitude of the oscillations is reduced and, upon the collapse of the pulse and the accompanying shift of the operating point back to its initial position, the oscillations are quenched, since they are no longer of sufficient amplitude to enter the region of negative resistance.

During periods of oscillation, energy is applied to the output wave guide 30 in the form of pulse-like bursts of electromagnetic wave energy 36, similar in form to the output pulses 20 shown in Fig. 4. It should be noted, however, that in contrast to the apparatus shown in Fig. 4, oscillatory pulses may be produced in accordance with the invention, as shown in Fig. 5, without the use of a source of continuous oscillations and without the use of a hybrid junction wave guide.

Figs. 6A and 6B illustrate how the principles of the invention may be employed to advantage in a pulse code modulation system. As explained in connection with the embodiment shown in Fig. 5A, the use of short bursts of oscillations offers advantages over direct-current pulses at high pulse repetition rates. In pulse code modulation systems, pulses accurately spaced in time, termed clock pulses, are employed to ensure accuracy in the timing of initially generated or regenerated signal pulses and to assist in the determination of whether or not a signal pulse is present in each time slot. By applying the principles of the invention, clock pulses may be employed uniquely to serve still another function, that of converting direct-current signal pulses into oscillatory bursts. As in the embodiments described above, a bias source is employed to establish the operating point of the diode D in the second region of positive resistance. The diode D and the resonant circuit comprising inductance L and capacitance C are substantially as shown in Fig. 3A, although a resonant cavity oscillator as shown in Fig. 5A may be employed advantageously where oscillations of exceptionally high frequency are required.

The pulses and oscillations shown in Fig. 6B illustrate the operation of the circuit of Fig. 6A. The preassigned amplitude of the clock pulses is such that the coincidence of a clock pulse and a signal pulse which exceeds a preassigned threshold is sufficient to shift the bias point of the diode D into the first positive resistance region and back to the initial bias point, thereby initiating oscillations, as shown at time $t_1$. At time $t_3$ a similar coincidence of pulses occurs, but since the circuit is already oscillating, there is at most a transient disturbance in the output oscillations. At time $t_5$ a clock pulse is applied across the diode D; but in the absence of a signal pulse, the amplitude of the clock pulse is only sufficient to shift the diode operating point into the negative resistance region and back to its initial position, thereby terminating the oscillations. In similar fashion oscillations are again initiated at time $t_7$ and terminated at time $t_9$.

The output oscillations are applied to a utilization device, as shown, which may be a receiver, for example, including means for scanning the output at times $t_2$, $t_4$, $t_6$, $t_8$, etc., as indicated by the small arrows. The presence of oscillations is interpreted as a pulse in the preceding time slot, and the absence of oscillations is interpreted as a space.

An additional application of the features of the invention is illustrated by Figs. 7A, 7B and 7C. Fig. 7A shows a schematic circuit diagram of a storage or memory matrix. Each of the memory elements comprises a negative resistance oscillator in accordance with the invention, as shown in Fig. 7B. Alternatively, each memory device may comprise a diode positioned in a resonant cavity as shown in Fig. 5A. The characteristics of the diode or other negative resistance device are as shown in Fig. 7C.

The memory elements are arranged in electrical correspondence to rows and columns. Row leads $X_1$, $X_2$ and $X_3$ connect the elements in the respective rows to the X switch. The X switch may be operated to apply one of two selected bias potentials, $P_1$ and $P_2$, to a selected element row. Column leads $Y_1$, $Y_2$ and $Y_3$ connect the elements in the respective columns to the Y switch. The Y switch may be operated to apply a signal from the Store Signal Source to all the elements in a selected one of the columns or similarly to apply an erase signal from the Erase Signal Source. Output leads $Z_1$, $Z_2$ and $Z_3$ connect the elements in each respective column to the readout circuit.

Storage in one of the elements, the $X_2Y_2$ element, for example, is accomplished as follows. Initially, all elements are connected through the X switch to the $P_1$ source which biases all diodes to the $P_1$ operating point as shown in Fig. 7C. To prepare the $X_2$ row for storage, the bias point on all elements in that row is shifted to point $P_2$, still in the positive resistance region $R_{2P}$ and just short of the valley point $V_P$. The Y switch is then operated to connect the signal source to the $Y_2$ lead. The signal to be stored may be of a relatively small amplitude, i.e., just sufficient to drive the diode operating point into the $R_N$ region and back to point $P_2$. Oscillations $S_3$ are initiated and, of particular consequence, are sustained and increased in amplitude about the bias point $P_2$, as shown by oscillations $S_2$ in Fig. 7C, upon the termination of the signal pulse and the accompanying reverse shift of the operating point. This increase or build-up of oscillation amplitude is the result of the proximity of the point $P_2$ to the $R_N$ region. Subsequent removal of the $P_2$ bias by the X switch merely shifts the point of oscillation to the point $P_1$ and, in accordance with one of the features of the invention, the amplitude of the oscillations in the $X_2Y_2$ element again increases from $S_2$ to $S_1$, as shown in Fig. 7C. In comparing this particular employment of the features of the invention with the embodiments shown in Figs. 3A, 5A and 6A, it will be noted that the storage system of Fig. 7A uniquely turns the principles of the invention to advantage by using a pair of operating points in the second positive resistance region, rather than only one, and each point is used for a separate and distinct purpose.

Readout is accomplished by operating the X switch to shift the bias on all elements of the read-out row from $P_2$ to $P_1$ and, as described above, the amplitude of all oscillations in the read-out row is increased. The diode $D_2$ shown in Fig. 7B is selected so that it is reverse-biased by the $P_1$ bias to a point at which it will pass only signals which exceed the amplitude of the oscillations $S_2$. Accordingly, since the $X_2Y_2$ memory element is the only element in the $Y_2$ column oscillating at the $S_1$ amplitude, a difference signal is applied to the $Z_2$ read-out lead as illustrated at the output point in Fig. 7B. Readout accomplished in this fashion is non-destructive.

Erasing stored signals is accomplished by applying a signal from the erase signal source through the Y switch to the column or columns to be erased. The row or rows to be erased are first biased from the $P_1$ bias source. The signal from the erase signal source is of sufficient amplitude to shift the operating point of the element or elements to be erased from $P_1$ to $P_3$ and back to $P_1$. The amplitude of the oscillations $S_1$ is thereby first reduced to the amplitude of the oscillations $S_3$ which is insufficient to reach into the negative region when the operating point shifts back to $P_1$. Since operation is wholly within the positive resistance region $R_{2P}$, oscillations $S_4$, which result from a shift of oscillations $S_3$ to operating point $P_1$, are abruptly quenched as shown in Fig. 7C.

It is to be understood that the above-described arrangements are merely illustrative of the application of the principles of this invention. Numerous other arrangements may be designed by those skilled in the art without departing from the spirit and scope of the invention.

What is claimed is:

1. Apparatus for producing intermittent oscillations comprising, in combination, an asymmetrically conducting impedance device characterized by a negative resistance region of average magnitude $R_N$ bounded by first and second positive resistance regions of average magnitude $R_{1P}$ and $R_{2P}$, respectively, the relative absolute magnitudes of said resistances conforming to the relation $$|R_{1P}|>|R_N|>|R_{2P}|$$

resonant circuit means connected in shunt relation with said device, means for establishing a first operating point lying in said second positive resistance region, means for applying across said device a first transient potential corresponding in magnitude and polarity to a transition from said first operating point to a second operating point lying in said first positive resistance region, whereby, upon the collapse of said first transient potential and the attendant shift back to said first operating point, oscillations are initiated in said resonant circuit means, means for applying across said device a second transient potential corresponding in magnitude and polarity to a transition from said first operating point to a third operating point lying in said negative resistance region, whereby, upon the collapse of said second transient potential and the attendant shift back to said first operating point, said oscillations are terminated.

2. Apparatus in accordance with claim 1 wherein said first transient potential applying means includes a source of pulses of a first preassigned polarity and a first preassigned magnitude and wherein said second transient potential applying means includes a source of pulses of said first polarity and a second magnitude less than said first magnitude.

3. Apparatus in accordance with claim 1 wherein said impedance device comprises a P-N junction diode characterized by a point of avalanche breakdown lying between said first positive resistance region and said negative resistance region.

4. Apparatus in accordance with claim 3 wherein said resonant circuit means comprises a resonant cavity and means positioning said diode in said resonant cavity.

5. Apparatus for converting direct-current pulses into corresponding bursts of high-frequency oscillations comprising, in combination, a source of direct-current pulses, means for converting each pulse from said source into a pair of pulses, the first pulse of each of said pairs corresponding to the leading edge of said source pulse, the second pulse of each of said pairs corresponding to the trailing edge of said source pulse, said first pulse being of the same polarity but of greater magnitude than said second pulse, an impedance device characterized by a region of negative resistance of average magnitude $R_N$ bounded by first and second regions of positive resistance of magnitudes $R_{1P}$ and $R_{2P}$, respectively, the relative absolute magnitudes of said resistances corresponding to the relation $$|R_{1P}|>|R_N|>|R_{2P}|$$

Resonant circuit means in shunt relation with said impedance device, means for establishing the operating point of said impedance device at an initial position in said second region of positive resistance, means for applying said pulse pairs across said impedance device, whereby said operating point is shifted abruptly by said first pulse to a position in said first region of positive resistance and, upon the termination of said first pulse, back to said initial position, thereby initiating oscillations in said resonant circuit, and whereby said operating point is shifted abruptly by said second pulse to a position in said region of negative resistance and, upon the termination of said second pulse, back to said initial position, thereby terminating said oscillations.

6. In a microwave logic system apparatus comprising, in combination, an asymmetrically conducting impedance device with reverse conduction characteristics including a region of negative resistance bounded by first and second regions of positive resistance, the absolute magnitude of the average resistance of said first region exceeding the absolute magnitude of the average resistance of said negative region which in turn exceeds the absolute magnitude of the average resistance of said second region, means positioning said impedance device in a resonant cavity thereby to form a negative resistance oscillator, means establishing the operating point of said impedance device at an initial position within said second positive resistance region, means for generating trains of pulses comprising pulse pairs, each pair comprising a first pulse of preassigned polarity and a preassigned amplitude and a second pulse of the same polarity and a lesser amplitude, and means for applying said pulses, successively, to said impedance device, said first pulse being of sufficient amplitude to shift said operating point abruptly into said first resistance region and, upon the termination of said first pulse, back to said initial point, thereby to change said oscillator from a quiescent to an oscillating condition, and said second pulse being of sufficient amplitude to shift said operating point abruptly into said second resistance region and, upon the termination of said second pulse, back to said initial point, thereby to change said oscillator from an oscillating to a quiescent condition, whereby said apparatus translates said pairs of pulses into pulse-like bursts of electromagnetic energy.

7. In a pulse code modulation system apparatus comprising a negative resistance device characterized by a region of negative resistance bounded by a first and a second region of positive resistance, the absolute magnitude of the average resistance of said first region exceeding the absolute magnitude of the average resistance of said negative region which in turn exceeds the absolute magnitude of the average resistance of said second region, tuned circuit means in parallel relation with said device, a source of bias potential, means applying said bias potential to said negative resistance device, thereby establishing the operating point of said device at a first point in said second region, a source of clock pulses of a single preassigned polarity and amplitude, a source of signal pulses of said single polarity, means for applying said clock pulses to said device, means for applying said signal pulses to said device, the combined amplitudes of one of said clock pulses and any one of said signal pulses exceeding a preassigned threshold being sufficient to shift said operating point abruptly into said first region and, upon the termination of said clock pulse and said signal pulse, back to said first point, the amplitude of one of said clock pulses alone being sufficient to shift said operating point abruptly from said first point to a point in said negative region and, upon the termination of said clock pulse, back to said first point, whereby sustained oscillations are initiated in said tuned circuit means by the coincidence of a clock pulse and a signal pulse exceeding said threshold, and whereby said oscillations are terminated by a clock pulse not coincident with signal pulses exceeding said threshold.

8. A signal storage matrix comprising a plurality of memory elements arranged in electrical correspondence to rows and columns, each one of said elements comprising resonant circuit means and an asymmetrically conducting impedance device in combination therewith with properties of reverse conduction characterized by a negative resistance region bounded by a first and a second region of positive resistance, the absolute magnitude of the average resistance of said first region exceeding the absolute magnitude of the average resistance of said negative region which in turn exceeds the absolute magnitude of the average resistance of said second region; first bias means for establishing the operating point of said device at a first position in said second resistance region relatively remote from said negative resistance region; second bias means for establishing the operating point of said device at a second position in said second resistance region relatively close to said negative resistance region; a source of signals to be stored in said elements, each of said signals comprising a pulse of a preassigned amplitude and a preassigned polarity such that its application to one of said devices effects a shift of said operating point abruptly from said second position to a position in said negative region and, upon the termination of said pulse, back to said second position; means for storing a selected one of said signals in a selected one of said elements, including means applying said second bias to said selected element and means applying said selected signal to said selected element whereby oscillations are initiated in said selected element; means for applying said first bias to a selected element row including said selected element and means for applying said second bias to all of said rows excepting said selected row, thereby to reduce the amplitude of any oscillations in said elements, excepting elements in said selected row, and means responsive to the difference in amplitude between oscillations about said first position and oscillations about said second position for detecting the presence of oscillations in said selected element, whereby non-destructive readout from said selected element is effected; and means for applying to said selected element a pulse of sufficient amplitude to shift said operating point abruptly from said first position to a position in said negative region and, upon the termination of said pulse, back to said first position, whereby the termination of oscillations in said selected element is effected.

9. Apparatus in accordance with claim 8 wherein said impedance device comprises a silicon P–N junction diode.

10. Apparatus in accordance with claim 8 wherein said resonant circuit means comprises a resonant cavity device, said impedance device being positioned in said resonant cavity for cooperative relation therewith as a negative resistance oscillator.

11. Apparatus in accordance with claim 8 wherein said detecting means comprises a second asymmetrically conducting impedance device.

References Cited in the file of this patent

UNITED STATES PATENTS

| | | |
|---|---|---|
| 2,735,011 | Dickinson | Feb. 14, 1956 |
| 2,807,719 | Cattermole | Sept. 24, 1957 |
| 2,884,617 | Pulvari | Apr. 28, 1959 |
| 2,891,160 | Le Blond | June 16, 1959 |
| 2,899,646 | Read | Aug. 11, 1959 |